US012044777B2

(12) United States Patent
Lock et al.

(10) Patent No.: US 12,044,777 B2
(45) Date of Patent: Jul. 23, 2024

(54) METHOD AND APPARATUS FOR DETECTING OPEN VEHICLE CABIN

(71) Applicant: Rivian IP Holdings, LLC, Irvine, CA (US)

(72) Inventors: Aaron Lock, Windsor (CA); Rohan Sunil Chaudhari, Canton, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 250 days.

(21) Appl. No.: 17/703,572

(22) Filed: Mar. 24, 2022

(65) Prior Publication Data
US 2023/0305145 A1 Sep. 28, 2023

(51) Int. Cl.
*G01S 15/88* (2006.01)
*G01W 1/10* (2006.01)
*G06V 20/56* (2022.01)

(52) U.S. Cl.
CPC .............. *G01S 15/88* (2013.01); *G01W 1/10* (2013.01); *G06V 20/56* (2022.01)

(58) Field of Classification Search
None
See application file for complete search history.

(56) References Cited

U.S. PATENT DOCUMENTS

| | | | |
|---|---|---|---|
| 2008/0129518 A1* | 6/2008 | Carlton-Foss | G08B 25/009 379/45 |
| 2023/0242130 A1* | 8/2023 | Krause | B60W 50/14 701/1 |
| 2023/0305145 A1* | 9/2023 | Lock | G01S 15/88 |

FOREIGN PATENT DOCUMENTS

| | | | | |
|---|---|---|---|---|
| CN | 113223311 A | * | 8/2021 | |
| DE | 102019124631 A1 | * | 3/2020 | B60W 30/06 |
| GB | 2455287 A | * | 6/2009 | E05F 15/73 |

* cited by examiner

*Primary Examiner* — Fekadeselassie Girma
(74) *Attorney, Agent, or Firm* — Haley Guiliano LLP

(57) ABSTRACT

A method for detecting that a vehicle cabin is open includes broadcasting an acoustic signal through an aural transducer in the vehicle cabin, detecting a returned signal using an aural detector in the vehicle cabin, comparing the returned signal to an expected signal using processing circuitry in the vehicle, and determining that the vehicle cabin is open when the returned signal differs from the expected signal by a predetermined amount, and outputting an indication that the vehicle cabin is open. Outputting the indication that the vehicle cabin is open may include sending a wireless signal to a remote user device to alert a user that the vehicle cabin is open. The method may be performed in response to inclement weather, which may be detected by a rain sensor or by receiving, from an external wireless source, data indicating approaching inclement weather.

18 Claims, 6 Drawing Sheets

METHOD AND APPARATUS FOR DETECTING OPEN VEHICLE CABIN

INTRODUCTION

This disclosure relates to a method and apparatus for detecting an open vehicle cabin. More particularly, this disclosure relates to an acoustic technique for detecting that an openable vehicle cabin surface—e.g., a roof panel or a window—has been left open (i.e., exposed to the environment outside of the vehicle cabin), without requiring any sensor on the open vehicle cabin surface itself.

Various surfaces of the cabin of a vehicle, such as an automobile or light truck, may be opened by a driver/user. For example, windows, sunroofs, moonroofs, retractable rooves and convertible tops all may be opened to expose the vehicle cabin to the environment outside of the vehicle cabin. In addition, some vehicles have manually removable roof panels. If a user leaves such a surface open inadvertently when exiting the vehicle, or if a surface is left open intentionally but the weather changes, the vehicle cabin may be vulnerable to unauthorized entry by others, and to damage from precipitation.

SUMMARY

A method according to implementations of the subject matter of this disclosure, for detecting that a vehicle cabin is open, includes broadcasting an acoustic signal through an aural transducer in the vehicle cabin, detecting a returned signal using an aural detector in the vehicle cabin, comparing the returned signal to an expected signal using processing circuitry in the vehicle, determining that the vehicle cabin is open when the returned signal differs from the expected signal by at least a predetermined amount, and outputting an indication that the vehicle cabin is open.

In a first implementation of such a method, broadcasting the acoustic signal through the aural transducer in the vehicle cabin may include broadcasting the acoustic signal including a frequency component configured to excite a resonant frequency of the vehicle cabin.

According to a first aspect of that first implementation, determining that the vehicle cabin is open when the returned signal differs from the expected signal may include determining that the vehicle cabin is open when a resonant peak of the returned signal occurs at a frequency other than the resonant frequency of the vehicle cabin.

In a first instance of that first aspect of the first implementation, determining that the vehicle cabin is open when the resonant peak of the returned signal occurs at a frequency other than the resonant frequency of the vehicle cabin may include determining that the vehicle cabin is open when the resonant peak of the returned signal occurs at a frequency lower than the resonant frequency of the vehicle cabin.

In a second implementation of such a method, outputting the indication that the vehicle cabin is open may include sending a wireless signal to a remote user device to alert a user that the vehicle cabin is open.

According to a first aspect of that second implementation, the broadcasting, the detecting, the comparing, the determining, and the outputting may be performed in response to inclement weather.

In a first instance of that first aspect of the second implementation, the broadcasting, the detecting, the comparing, the determining, and the outputting may be performed in response to detection of water by a rain sensor of the vehicle.

In a second instance of the first aspect of the second implementation, the broadcasting, the detecting, the comparing, the determining, and the outputting may be performed in response to receiving, from an external wireless source, data indicating approaching inclement weather.

According to a second aspect of the second implementation, the broadcasting, the detecting, the comparing, the determining, and the outputting may be performed in response to a query from a remote user device regarding state of the vehicle cabin.

According to implementations of the subject matter of this disclosure, apparatus for detecting that a vehicle cabin is open includes an aural transducer configured to broadcast an acoustic signal in the vehicle cabin, an aural detector in the vehicle cabin configured to detect a returned signal, and processing circuitry in the vehicle configured to compare the returned signal to an expected signal, to determine that the vehicle cabin is open when the returned signal differs from the expected signal by at least a predetermined amount, and to output an indication that the vehicle cabin is open.

In a first implementation of such an apparatus, the aural transducer may be configured to broadcast the acoustic signal including a frequency component configured to excite a resonant frequency of the vehicle cabin.

According to a first aspect of that first implementation, the processing circuitry may be configured to determine that the vehicle cabin is open when a resonant peak of the returned signal occurs at a frequency other than the resonant frequency of the vehicle cabin.

In a first instance of that first aspect of the first implementation, the processing circuitry may be configured to determine that the vehicle cabin is open when the resonant peak of the returned signal occurs at a frequency lower than the resonant frequency of the vehicle cabin.

In a second implementation of such apparatus, the processing circuitry may be configured to send a wireless signal to a remote user device to alert a user that the vehicle cabin is open.

According to a first aspect of that second implementation, the processing circuitry may be configured to initiate broadcasting of the acoustic signal by the aural transducer, detection of the returned signal by the aural detector, comparing of the returned signal to the expected signal to determine that the vehicle cabin is open, and outputting of the indication, in response to inclement weather.

A first instance of that first aspect of the second implementation may further include a rain sensor configured to detect inclement weather.

A second instance of that first aspect of the second implementation may further include a receiver configured to receive, from an external wireless source, data indicating approaching inclement weather.

According to a second aspect of that second implementation, the processing circuitry may be configured to initiate broadcasting of the acoustic signal by the aural transducer, detection of the returned signal by the aural detector, comparing of the returned signal to the expected signal to determine that the vehicle cabin is open, and outputting of the indication, in response to a query signal from a remote user device regarding state of the vehicle cabin.

According to implementations of the subject matter of this disclosure, a method for warning a vehicle user that a vehicle cabin is open includes detecting inclement weather, in response to detecting inclement weather, determining whether the vehicle cabin is open, and in response to determining that the vehicle cabin is open, sending a wireless signal to a remote user device to alert the vehicle user that the vehicle cabin is open.

A first implementation of such a method may further include receiving a query signal from the remote user device regarding state of the vehicle cabin, in response to receiving the query signal, making the determination of whether the vehicle cabin is open, and in response to making the determination that the vehicle cabin is open, sending the wireless signal to the remote user device to alert the vehicle user that the vehicle cabin is open.

BRIEF DESCRIPTION OF THE DRAWINGS

Further features of the subject matter of this disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
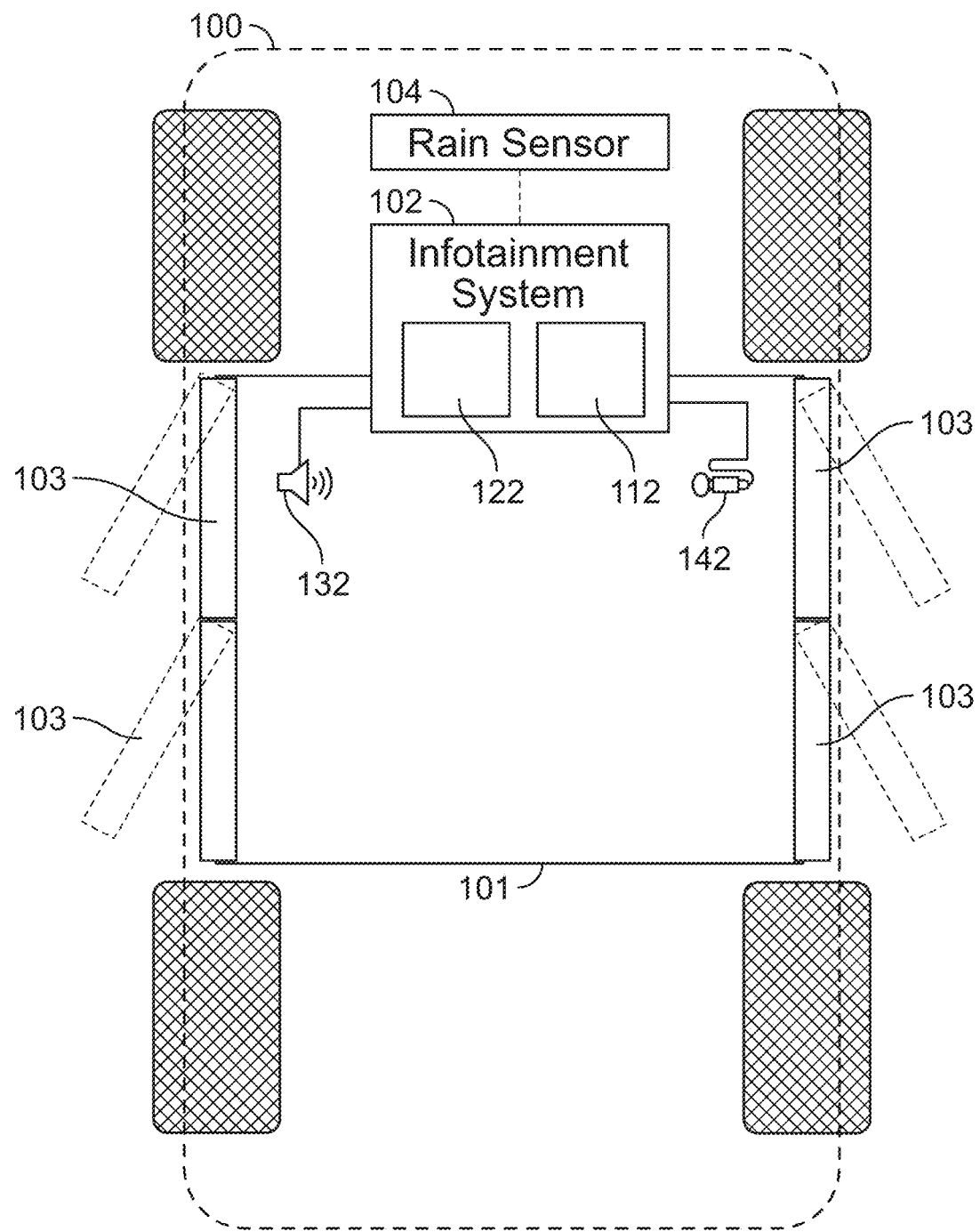
FIG. 1 is a diagram of an illustrative vehicle incorporating implementations of the subject matter of this disclosure.

As noted above, if a vehicle user inadvertently leaves an openable cabin surface open to the environment outside of the vehicle cabin when exiting the vehicle, or if a surface is intentionally left open to the environment outside of the vehicle cabin but the weather changes, the vehicle cabin may be vulnerable to unauthorized entry by others, and to damage from precipitation. In order to mitigate such circumstances, sensors may be provided that detect whether a vehicle panel is opened or closed. Alternatively, insofar as many such panels have powered opening and closing systems, the state of the panel can be stored in memory by the vehicle control system. If a user can then be alerted to the open panel—either before leaving the vehicle or by a remote device having a direct or indirect data connection to the vehicle—the user can initiate action to close the open panel.

However, adding sensors to detect open vehicle panels adds to the cost—and, more significantly, to the weight—of the vehicle. Increasing vehicle weight increases fuel or power consumption, which is of special concern in electric vehicles and particularly battery electric vehicles. Reliance on the vehicle control system to store the state of the panel can mitigate the lack of sensors but, as noted above, there are certain types of panels—e.g., hand-operated windows or manually removable roof panels—whose state cannot be known by the vehicle control system.

Therefore, in accordance with implementations of the subject matter of this disclosure, an acoustic technique may be used to determine whether a vehicle panel is open to the environment outside of the vehicle cabin. The acoustic technique, described below, does not require that any panel have any type of position sensor, nor does it require adding any additional hardware systems to a vehicle, so long as the vehicle has at least one speaker or other aural transducer for broadcasting sounds, and a microphone or other aural detector for detecting sounds, as well as a processor that can interface with those transducers or detectors. For example, most contemporary vehicles include an "infotainment" system having at least one speaker for playing sounds from a radio or other source, as well as a microphone which may be part of, e.g., a handsfree communications system.

In an acoustic technique according to implementations of the subject matter of this disclosure, when it is desired to test whether any vehicle panel is open to the environment outside of the vehicle cabin (criteria that may determine whether or when such a test should be performed are discussed below), a known sound profile such as random noise (including, e.g., white, pink or brown noise) can be broadcast through a speaker or other aural transducer in the vehicle. Although the noise may be random, it may be advantageous for the noise to contain frequency components capable of exciting a resonant acoustic mode—e.g., a resonant frequency—of the vehicle cabin. In some configurations, the noise may contain multiple portions containing different frequency components, for example, a sweep across multiple frequency components. In some implementations, specifically selected non-random noise, such as a recording of a certain sound or sounds or a selected musical composition, may also be used, if it is capable of exciting a resonant acoustic mode of the vehicle cabin.

A returned signal, representing the broadcast sound profile as modified by propagation through the vehicle cabin, may be detected by the aforementioned vehicle microphone or other aural detector, and then compared (e.g., in a processor of the aforementioned infotainment system) to an expected returned signal, which may have been previously recorded when the system was configured. Broadly, if the returned signal differs from the expected return signal (e.g., by more than a predetermined amount), the system would conclude that a cabin panel or movable cabin surface is open, exposing the vehicle cabin to the environment outside of the vehicle cabin.

More specifically, the returned signal may be analyzed in terms of amplitude as a function of frequency. Resonant modes of most vehicle cabins can be expected to occur at 50 Hz or less, so the analysis may be limited to frequencies of 50 Hz or below. If a vehicle panel is open or missing, the frequency of any resonant peak or peaks in the return signal would be expected to decrease. Therefore, if any peaks of the returned signal are shifted to lower frequencies than in the expected return signal (e.g., by a predetermined amount), it can be concluded that a cabin panel or movable cabin surface of the vehicle is open. The predetermined amount of frequency shift (e.g., the difference in frequency and number of resonant peak or peaks that are shifted) that is sufficient to conclude that the vehicle is open to the environment outside of the vehicle cabin will depend on the particular vehicle, and may be determined empirically. As just one example, a frequency shift of ±5 Hz in a resonant peak may be deemed sufficient to indicate that the cabin is not closed.

The acoustic test may be conducted whenever a user leaves the vehicle—e.g., as detected by opening of the doors and reduction in weight indicated by seat sensors (normally provided to determine when seat belt warnings are required). The acoustic test also may be conducted when a user initiates an inquiry (e.g., if unable to remember if any panel was left open) via a remote device such as an application on a mobile telephone. Finally, the acoustic test may be conducted in case of inclement weather, which may be detected by a rain sensor (normally provided to operate rain-sensitive windshield wipers) or by receipt of a signal from a remote source of weather data.

According to another aspect of the subject matter of this disclosure, detection of inclement weather may trigger a test to determine whether the vehicle cabin is open to the environment outside of the vehicle cabin and, if the vehicle cabin is open to the environment outside of the vehicle cabin, a transmission of a warning to a remote user device, so that the user knows to return to the vehicle if it is necessary to secure the vehicle from the inclement weather. In some implementations of this aspect of the subject matter of this disclosure, the warning may be transmitted the remote user device in response to detection of inclement weather following a query received from the remote user device. In accordance with this aspect of the invention, the detection of the vehicle cabin being open to the environment outside of the vehicle cabin may be accomplished using any available technique, including the acoustic technique described above, but also by using, e.g., conventional sensors/switches.

The subject matter of this disclosure may be better understood by reference to FIGS. 1-6, which illustrate implementations of the subject matter of this disclosure in a vehicle, which may be an electric vehicle.

FIG. 1 is a diagram of an illustrative vehicle 100 in accordance with implementations of the subject matter of the present disclosure, having a cabin 101. Although not seen in the two-dimensional schematic plan view of FIG. 1, vehicle cabin 101 has an interior volume which has at least one acoustic resonant mode at a resonant frequency. For most vehicles, the resonant frequency of cabin 101 may be expected to be at most 50 Hz. Vehicle cabin 101 may also have one or more removable or openable panels, such as doors, windows, a retractable or convertible roof, and/or manually-removable roof panels.

Vehicle 100 may also include an "infotainment" system 102 that includes a processor 112 and a communications unit 122. Communications unit 122 may include one or more of (a) a terrestrial radio receiver (e.g., an AM/FM radio), (b) a satellite radio receiver (e.g., for global positioning system operation and/or for satellite radio), (c) a cellular transceiver for data, and (d) a BLUETOOTH® short-range transceiver. While processor 112 and a communications unit 122 may or may not be inside cabin 101, at least a control interface (not shown) will be located in the cabin and accessible to a user. In addition, at least one aural transducer such as speaker 132 (e.g., for use with the various radio services as well as for hands-free operation of a user's mobile telephone via the BLUETOOTH® short-range transceiver) and one aural detector such as microphone 142 (e.g., for hands-free operation of a user's mobile telephone via the BLUETOOTH® short-range transceiver) may be mounted within cabin 101.

The cabin door 104 may have a sensor switch (not shown) to indicate whether the door is open or closed, for safety and security purposes as well as to control interior cabin illumination. However, adding sensors to indicate the presence or position of the other removable or openable cabin panels listed above would add weight and cost to vehicle 100. Therefore, such sensors might not be provided. Although the positions of certain removable or openable cabin panels that are opened and closed using powered systems may be determinable from those systems, the positions of other panels such as manually-operated windows or removable roof panels may not be able to be determined in the absence of a sensor.

In accordance with implementations of the subject matter of this disclosure, whether or not a vehicle cabin has an open panel may be determined without installing a sensor on any panel. In some implementations, the determination will indicate only that all panels are closed, or that there is open panel but without specifically identifying which panel is open. The determination is made by broadcasting, through speaker 132 or other aural transducer, a known acoustic signal tuned to excite a resonant mode of vehicle cabin 101. A return signal will be detected by microphone 142 or other aural detector. A nominal expected return signal can be determined in advance by measuring the return signal of a closed empty cabin, and can be expected to have one or more resonant peaks at particular frequencies. The resonant frequency or frequencies of the vehicle cabin 101 will depend on a variety of factors, including the interior passenger/cargo volume of the cabin, the contents of the cabin, and the material makeup of the contents of the cabin. Accordingly, different vehicles may have different nominal expected return signals.

If all panels are closed, the return signal will be identical to, or within a predetermined amount of, the nominal expected return signal for that vehicle. If any panel is open, the return signal will be different. For example, a frequency shift of ±5 Hz may be deemed sufficiently significant to indicate that the vehicle cabin is not closed. In many cases, the result of an open panel will be that the resonant peak is shifted to a lower frequency, because the open panel results in an effective increase in the interior volume of the cabin. In some implementations the system will identify that there is an open panel, without identifying the particular panel. In other implementations, it may be possible to record different expected return signals for different configurations of open panels (e.g., an open roof might cause a different change in the acoustic profile than an open window would), which would allow a more specific determination of what is open by, for example, comparing which specific resonant peaks in the return signal differ from the nominal expected return signal, and by what amount.

The generation and broadcasting of the known acoustic signal, and the processing of the return signal to compare it to the nominal expected return signal, may be carried out by any suitable processor. However, because these functions can be performed using speaker 132 and microphone 142 or other aural transducers/detectors which are part of infotainment system 102, and because infotainment system 102 includes processor 112, it may be advantageous to perform these functions using processor 112, rather than adding a special-purpose additional processor to vehicle 100.

Figure 2:
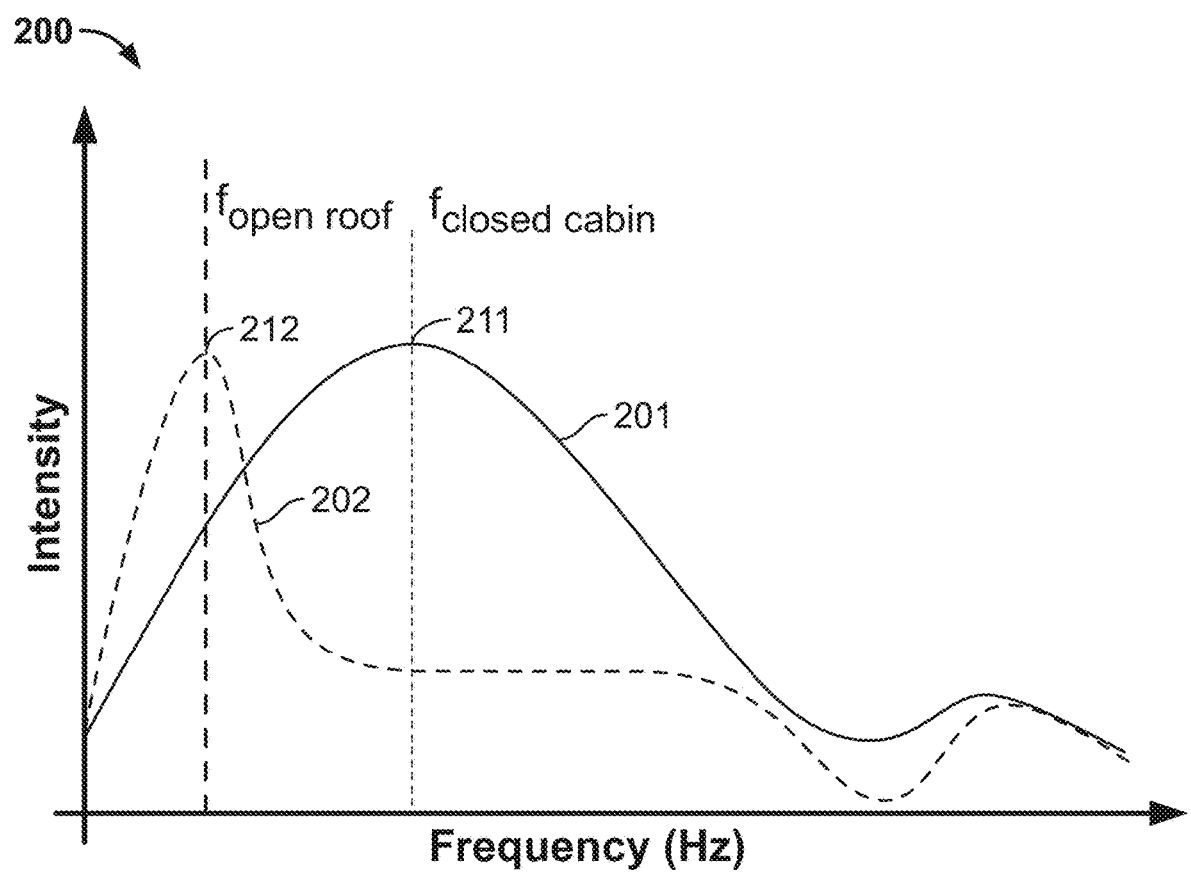
FIG. 2 is a plot of theoretical responses of a vehicle cabin to white noise broadcast in the vehicle cabin.

FIG. 2 is plot 200 of theoretical responses of a vehicle cabin to random (e.g., white) noise broadcast from speaker 132 or another aural transducer. Waveform 201 is the theoretical response of a typical closed vehicle cabin to random noise broadcast from speaker 132 or another aural transducer, with a resonance peak 211. The specific resonant frequency of any particular vehicle cabin will depend on the particular cabin configuration, but can be expected to be at most 50 Hz. Waveform 202 is the theoretical response of a typical vehicle cabin, with an open roof, to the same random noise broadcast from speaker 132 or another aural transducer. As can be seen, resonance peak 212 occurs at a lower frequency than resonance peak 211; in this example, the frequency of resonance peak 212 is less than half the frequency of resonance peak 211. Such a substantial change in the resonance frequency from the expected resonance frequency may be taken as an indication that vehicle cabin 101 is open to the environment outside vehicle cabin 101.

In some implementations, the processing of the return signal to compare it to the nominal expected return signal may account for the cabin not being completely empty (e.g., using seat sensors or the like). In other implementations, a new nominal expected return signal may be determined periodically or upon a determination that the contents—whether in terms of passengers or cargo—of the cabin have changed. In general, however, the resonance frequency of a closed cabin would not be expected to deviate significantly (i.e., would not be expected to shift beyond a predetermined amount sufficient to conclude that a panel is open) even when filled with passengers or cargo.

Figure 3:
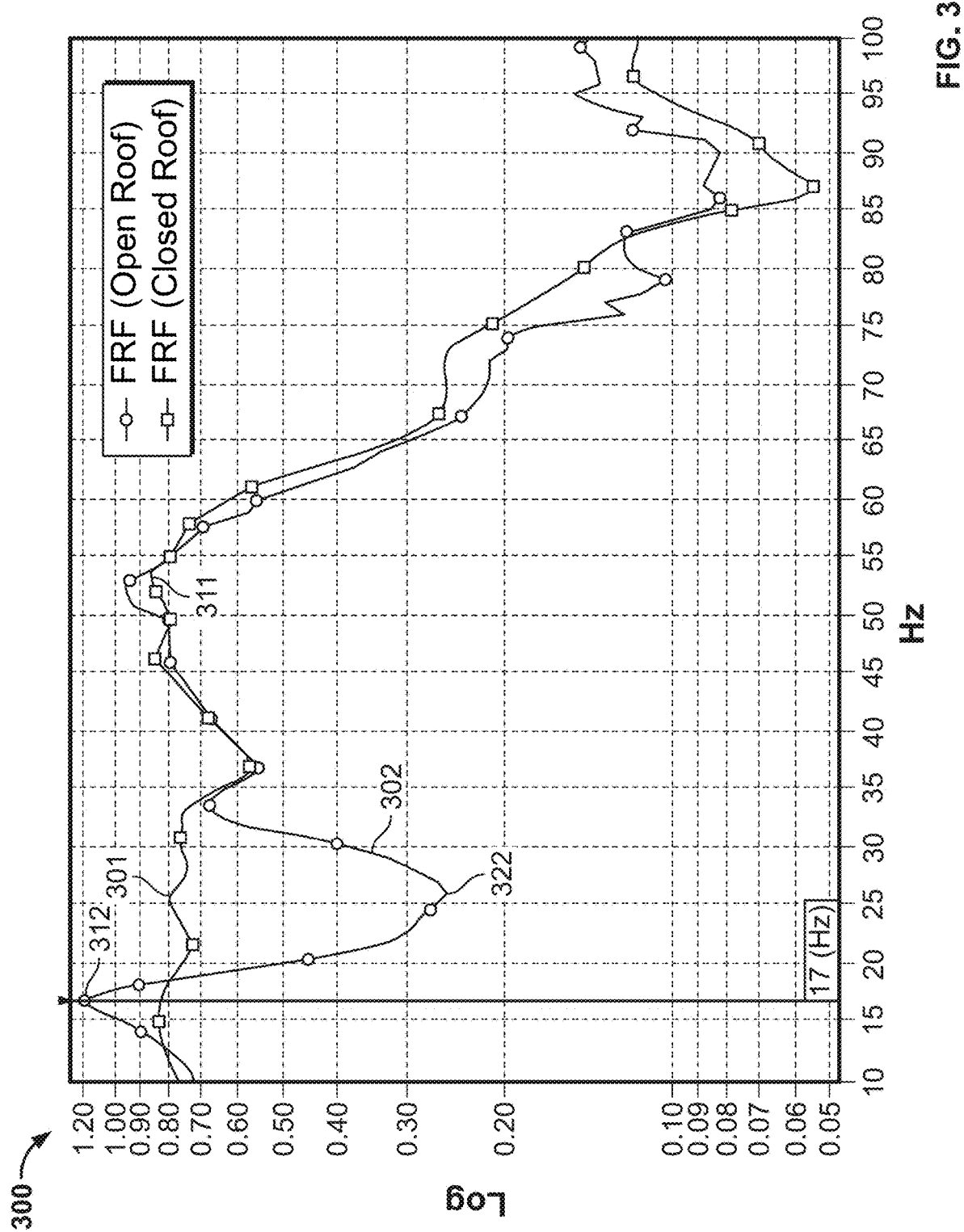
FIG. 3 is a plot of actual responses of a vehicle cabin to white noise broadcast in the vehicle cabin.
Figure 4:
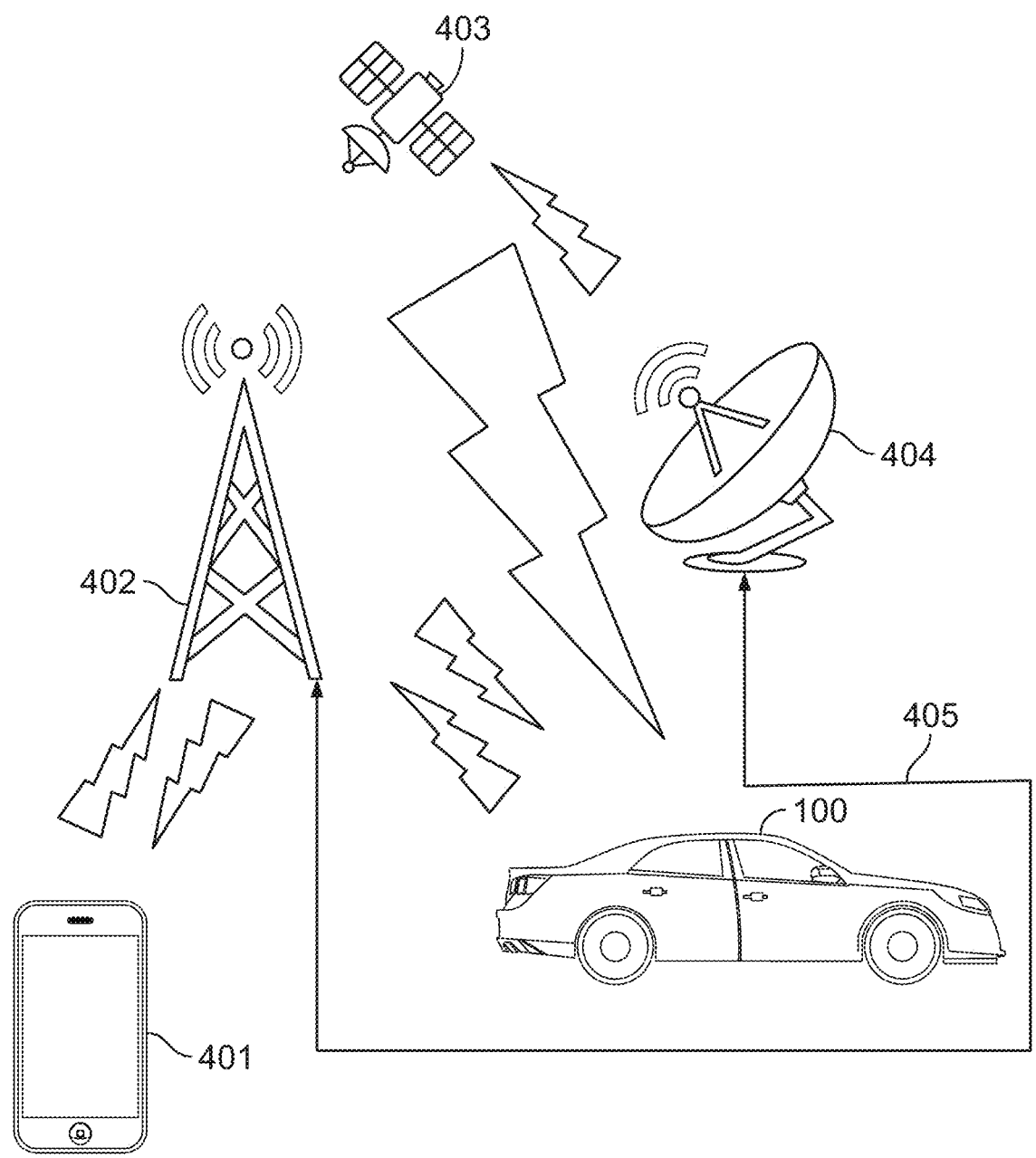
FIG. 4 is a diagram illustrating communication between an illustrative vehicle incorporating implementations of the subject matter of this disclosure, and a mobile device.

An example is shown in FIG. 3 which is a plot 300 of the frequency response function (FRF) of microphone 142 or another aural detector when white noise is broadcast through speaker 132 or another aural transducer, for a vehicle cabin having an interior volume of 4.6 m$^3$. Waveform 301 is a logarithmic plot of sound pressure, measured in Pascals, as a function of frequency for a closed vehicle cabin, having a resonance peak 311 at about 50 Hz. Waveform 302 is a logarithmic plot of sound pressure, measured in Pascals, as a function of frequency for a vehicle cabin having an open roof. As can be seen, the portion of the waveform above 40 Hz is substantially unchanged, but a new resonant peak 312 at about 17 Hz, along with an anti-resonant valley 322 at about 25 Hz, are present.

Once it is determined that a panel of vehicle cabin 101 is open, the driver/user may be warned, so that the driver/user can make a decision as to whether it is necessary to return to the vehicle to secure the cabin.

In accordance with implementations of the subject matter of this disclosure, examples of warning the driver/user include, but are not limited to, sounding the vehicle horn or other audible alarm, and/or sending a signal to a remote user device carried by the user. For example, the driver/user may have a vehicle interface application on a mobile telephone 401 (see FIG. 4), which may provide an alert and/or visual indication that a panel is open. In such examples, such vehicle interface applications may be in data contact with processor 112 via the cellular data transceiver in communications unit 122, and the terrestrial mobile telephone network represented by tower 402.

Alternatively, while mobile telephone 401 communicates via terrestrial mobile telephone network 402, and vehicle 100 sends data via terrestrial mobile telephone network 402 using the cellular data transceiver in communications unit 122, vehicle 100 may receive data from satellite 403 using a GPS/satellite radio receiver (not shown) in communications unit 122. Satellite 403 communicates with ground station 404 which may be coupled, e.g., to terrestrial mobile telephone network 402, via public switched telephone network 405.

As noted above, the acoustic test may be conducted whenever a user leaves vehicle 100 (in such case, the aforementioned option of informing the user by sounding the vehicle horn may be effective)—e.g., as detected by opening of doors 104 and reduction in weight indicated by seat sensors (normally provided to determine when seat belt warnings are required). The acoustic test may also be conducted when a user initiates an inquiry (e.g., if concerned that a panel may have been left open) via a remote device such as the aforementioned vehicle interface application on mobile telephone 401. Finally, the acoustic test may be conducted in case of inclement weather, which may be detected by rain sensor 104 (normally provided to operate rain-sensitive windshield wipers) or by receipt of a signal from a remote source of weather data via infotainment system 102.

According to another aspect of the subject matter of this disclosure, if inclement weather is detected (whether using rain sensor 104 or via a received weather signal), or if the user makes a remote cabin status inquiry, and an open cabin condition is detected (regardless of how an open cabin condition is detected—whether by the acoustic technique described above or by more conventional sensors, etc.), a wireless signal may be sent to a remote user device to alert the vehicle user that the vehicle cabin is open.

Figure 5:
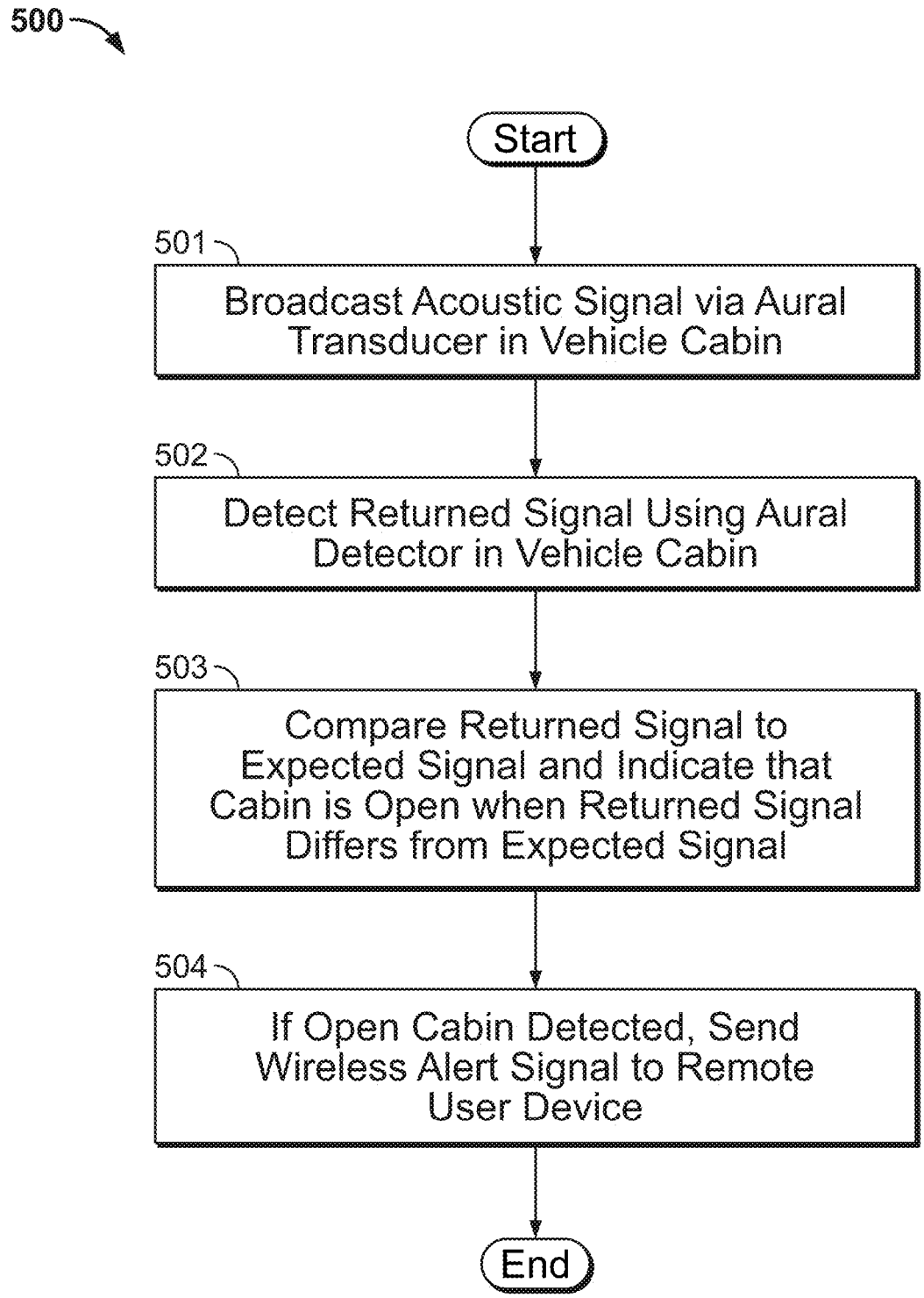
FIG. 5 is a flow diagram illustrating a method according to implementations of the subject matter of this disclosure for detecting that a vehicle cabin is open to the environment outside of the vehicle cabin.

A method 500 according to implementations of the subject matter of this disclosure for detecting that a vehicle cabin is open to the environment outside the vehicle cabin is diagrammed in FIG. 5, and begins at 501 where an aural transducer (e.g., a radio speaker) in the vehicle cabin broadcasts an acoustic signal, which may be random noise, such as white noise. At 502, a returned signal is detected using an aural detector (e.g., a handsfree microphone) in the vehicle cabin. At 503, the returned signal is compared to an expected signal using processing circuitry in the vehicle (such as a processor in the infotainment system), and an indication that the vehicle cabin is open to the environment outside the vehicle cabin is output when the returned signal differs from the expected signal.

Following detection that the vehicle cabin is open to the environment outside the vehicle cabin, at 504, a wireless signal may be sent to a remote user device to alert a user that the vehicle cabin is open to the environment outside the vehicle cabin, and method 500 ends.

Figure 6:
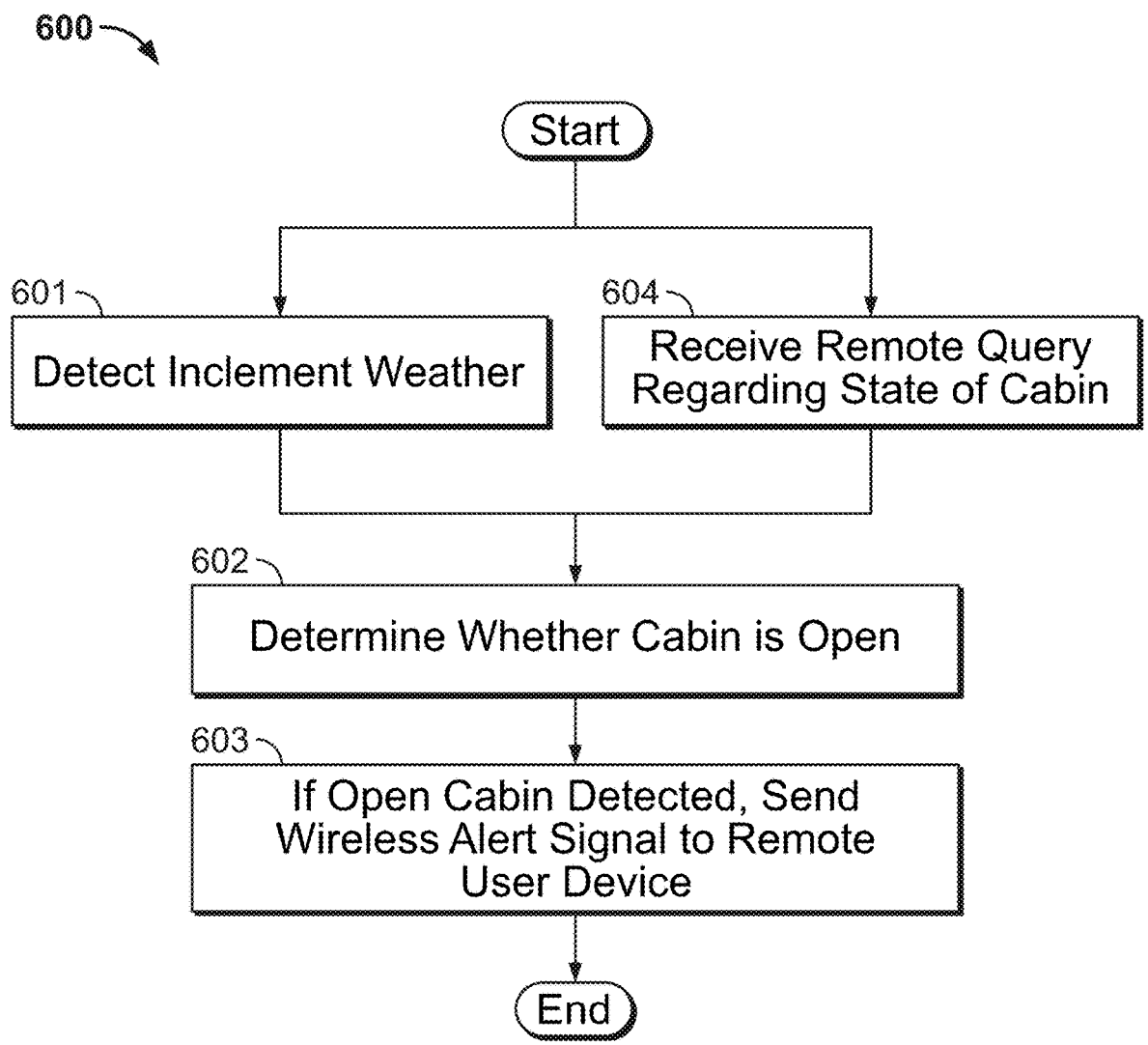
FIG. 6 is a flow diagram illustrating a method according to other implementations of the subject matter of this disclosure for warning a vehicle user that a vehicle cabin is open to the environment outside of the vehicle cabin.

A further method 600 according to other implementations of the subject matter of this disclosure for warning a vehicle user that a vehicle cabin is open to the environment outside the vehicle cabin is diagrammed in FIG. 6, and begins at 601 where inclement weather is detected. At 602, in response to detecting inclement weather, a determination is made as to whether the vehicle cabin is open to the environment outside the vehicle cabin. At 603, in response to a determination that the vehicle cabin is open to the environment outside the vehicle cabin, a wireless signal is sent to a remote user device to alert the vehicle user that the vehicle cabin is open to the environment outside the vehicle cabin.

According to further aspects of method 600, at 604, a query signal is received from the remote user device regarding the state of the vehicle cabin, and at 602, in response to receiving the query signal, a further determination is made as to whether the vehicle cabin is open to the environment outside the vehicle cabin. At 603, in response to making that other determination that the vehicle cabin is open to the environment outside the vehicle cabin, a wireless signal is sent to the remote user device to alert the vehicle user that the vehicle cabin is open to the environment outside the vehicle cabin, and method 600 ends.

Thus it is seen that method and apparatus for an acoustic technique for detecting that an openable vehicle cabin surface—e.g., a roof panel or a window—has been left open to the environment outside the vehicle cabin, without requiring any sensor on the open vehicle cabin surface itself, as well as a method for warning a user of an open vehicle cabin, have been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method for detecting that a vehicle cabin is open, the method comprising:
   broadcasting an acoustic signal through an aural transducer in the vehicle cabin, wherein the acoustic signal comprises a frequency component configured to excite a resonant frequency of the vehicle cabin;
   detecting a returned signal using an aural detector in the vehicle cabin;
   comparing the returned signal to an expected signal corresponding to a closed vehicle cabin using processing circuitry in the vehicle;
   determining that the vehicle cabin is open when the resonant frequency of the returned signal differs from the resonant frequency of the expected signal by at least a predetermined amount; and
   in response to the determining outputting an indication that the vehicle cabin is open.

2. The method of claim 1 wherein determining that the vehicle cabin is open when the returned signal differs from the expected signal comprises determining that the vehicle cabin is open when a resonant peak of the returned signal occurs at a frequency other than the resonant frequency of the vehicle cabin.

3. The method of claim 2 wherein determining that the vehicle cabin is open when the resonant peak of the returned signal occurs at a frequency other than the resonant frequency of the vehicle cabin comprises determining that the vehicle cabin is open when the resonant peak of the returned signal occurs at a frequency lower than the resonant frequency of the vehicle cabin.

4. The method of claim 1 wherein outputting the indication that the vehicle cabin is open comprises sending a wireless signal to a remote user device to alert a user that the vehicle cabin is open.

5. The method of claim 4 wherein the broadcasting, the detecting, the comparing, the determining, and the outputting are performed in response to inclement weather.

6. The method of claim 5 wherein the broadcasting, the detecting, the comparing, the determining, and the outputting are performed in response to detection of water by a rain sensor of the vehicle.

7. The method of claim 5 wherein the broadcasting, the detecting, the comparing, the determining, and the outputting are performed in response to receiving, from an external wireless source, data indicating approaching inclement weather.

8. The method of claim 4 wherein the broadcasting, the detecting, the comparing, the determining, and the outputting are performed in response to a query from a remote user device regarding state of the vehicle cabin.

9. Apparatus for detecting that a vehicle cabin is open, the apparatus comprising:
   an aural transducer configured to broadcast an acoustic signal in the vehicle cabin, wherein the acoustic signal comprises a frequency component configured to excite a resonant frequency of the vehicle cabin;
   an aural detector in the vehicle cabin configured to detect a returned signal corresponding to a closed vehicle cabin; and
   processing circuitry in the vehicle configured to compare the returned signal to an expected signal, to determine that the vehicle cabin is open when the resonant frequency of the returned signal differs from the resonant frequency of the expected signal by at least a predetermined amount, and in response the determining to output an indication that the vehicle cabin is open.

10. The apparatus of claim 9 wherein the processing circuitry is configured to determine that the vehicle cabin is open when a resonant peak of the returned signal occurs at a frequency other than the resonant frequency of the vehicle cabin.

11. The apparatus of claim 10 wherein the processing circuitry is configured to determine that the vehicle cabin is open when the resonant peak of the returned signal occurs at a frequency lower than the resonant frequency of the vehicle cabin.

12. The apparatus of claim 9 wherein the processing circuitry is configured to send a wireless signal to a remote user device to alert a user that the vehicle cabin is open.

13. The apparatus of claim 12 wherein the processing circuitry is configured to initiate broadcasting of the acoustic signal by the aural transducer, detection of the returned signal by the aural detector, comparing of the returned signal to the expected signal to determine that the vehicle cabin is open, and outputting of the indication, in response to inclement weather.

14. The apparatus of claim 13 further comprising a rain sensor configured to detect inclement weather.

15. The apparatus of claim 13 further comprising a receiver configured to receive, from an external wireless source, data indicating approaching inclement weather.

16. The apparatus of claim 12 wherein the processing circuitry is configured to initiate broadcasting of the acoustic signal by the aural transducer, detection of the returned signal by the aural detector, comparing of the returned signal to the expected signal to determine that the vehicle cabin is open, and outputting of the indication, in response to a query signal from a remote user device regarding state of the vehicle cabin.

17. A method for warning a vehicle user that a vehicle cabin is open, the method comprising:
   detecting inclement weather;
   in response to detecting inclement weather, determining whether the vehicle cabin is open by:
      broadcasting an acoustic signal comprising a frequency component configured to excite a resonant frequency of the vehicle cabin; and
      determining that the vehicle cabin is open when the resonant frequency of the returned signal differs from the resonant frequency of the expected signal of a closed vehicle cabin by at least a predetermined amount; and
   in response to determining that the vehicle cabin is open, sending a wireless signal to a remote user device to alert the vehicle user that the vehicle cabin is open.

18. The method of claim 17 further comprising:
   receiving a query signal from the remote user device regarding state of the vehicle cabin; and
   in response to receiving the query signal, making a determination of whether the vehicle cabin is open; and
   in response to making the determination that the vehicle cabin is open, sending a wireless signal to the remote user device to alert the vehicle user that the vehicle cabin is open.

* * * * *